US 6,661,446 B2

(12) United States Patent
Beier et al.

(10) Patent No.: US 6,661,446 B2
(45) Date of Patent: Dec. 9, 2003

(54) PARALLEL-PROCESSING, OPTICAL DISTANCE-MEASURING DEVICE

(75) Inventors: Bernard Beier, Ladenburg (DE); Bernd Vosseler, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/946,708

(22) Filed: Sep. 4, 2001

(65) Prior Publication Data
US 2002/0027594 A1 Mar. 7, 2002

(30) Foreign Application Priority Data
Sep. 7, 2000 (DE) .......................... 100 44 082
Mar. 9, 2001 (DE) .......................... 101 11 245

(51) Int. Cl.[7] .............................................. B41J 27/00
(52) U.S. Cl. ....................................... 347/241; 347/256
(58) Field of Search ................. 347/241, 244, 347/256, 258; 355/53; 369/121; 350/559.31

(56) References Cited

U.S. PATENT DOCUMENTS

| 4,546,460 A |   | 10/1985 | Ando ..................... 369/44.24 |
| 4,823,014 A | * | 4/1989 | Miyawaki ............. 250/559.31 |
| 5,248,992 A | * | 9/1993 | Ferschl ....................... 347/258 |
| 5,302,997 A |   | 4/1994 | Cocca ........................ 369/99 |
| 5,365,535 A | * | 11/1994 | Yamaguchi et al. ........ 369/121 |
| 6,195,154 B1 | * | 2/2001 | Imai ............................ 355/53 |

* cited by examiner

Primary Examiner—Hai Pham
(74) Attorney, Agent, or Firm—Davidson, Davidson & Kappel, LLC

(57) ABSTRACT

A device determines the positional deviation of n points (P) from their reference positions using a source of electromagnetic radiation (1), imaging optics (2, 4, 9), and a photosensitive detector (10), which converts the positional information into information on intensity. Simultaneous or concurrent in time n signals are produced by the detector (10), each of the n signals being uniquely assigned to one of the reflection points (P). The generated signals can be used to control an autofocusing device or to control the intensity of light sources in devices for imaging printing forms.

21 Claims, 10 Drawing Sheets

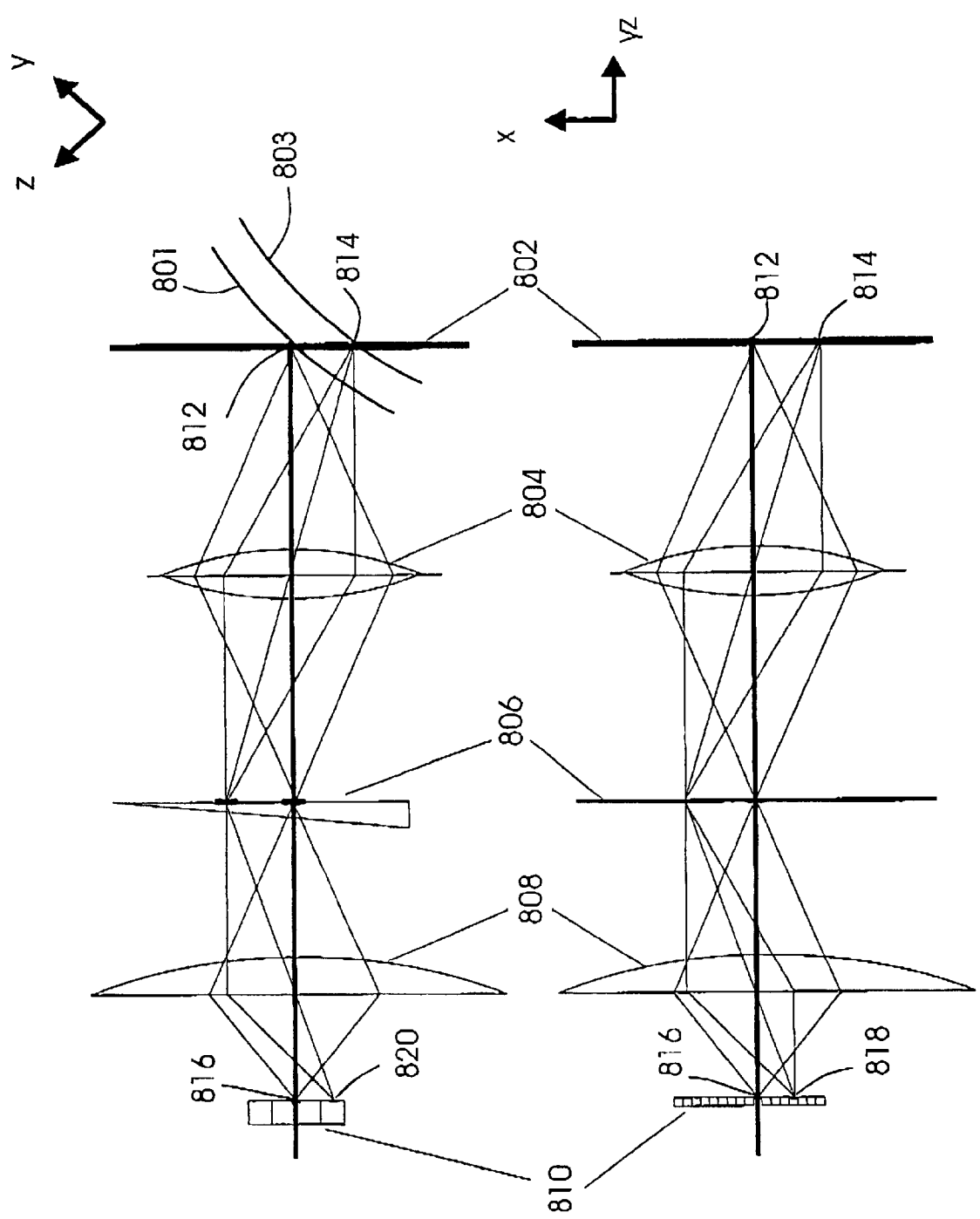

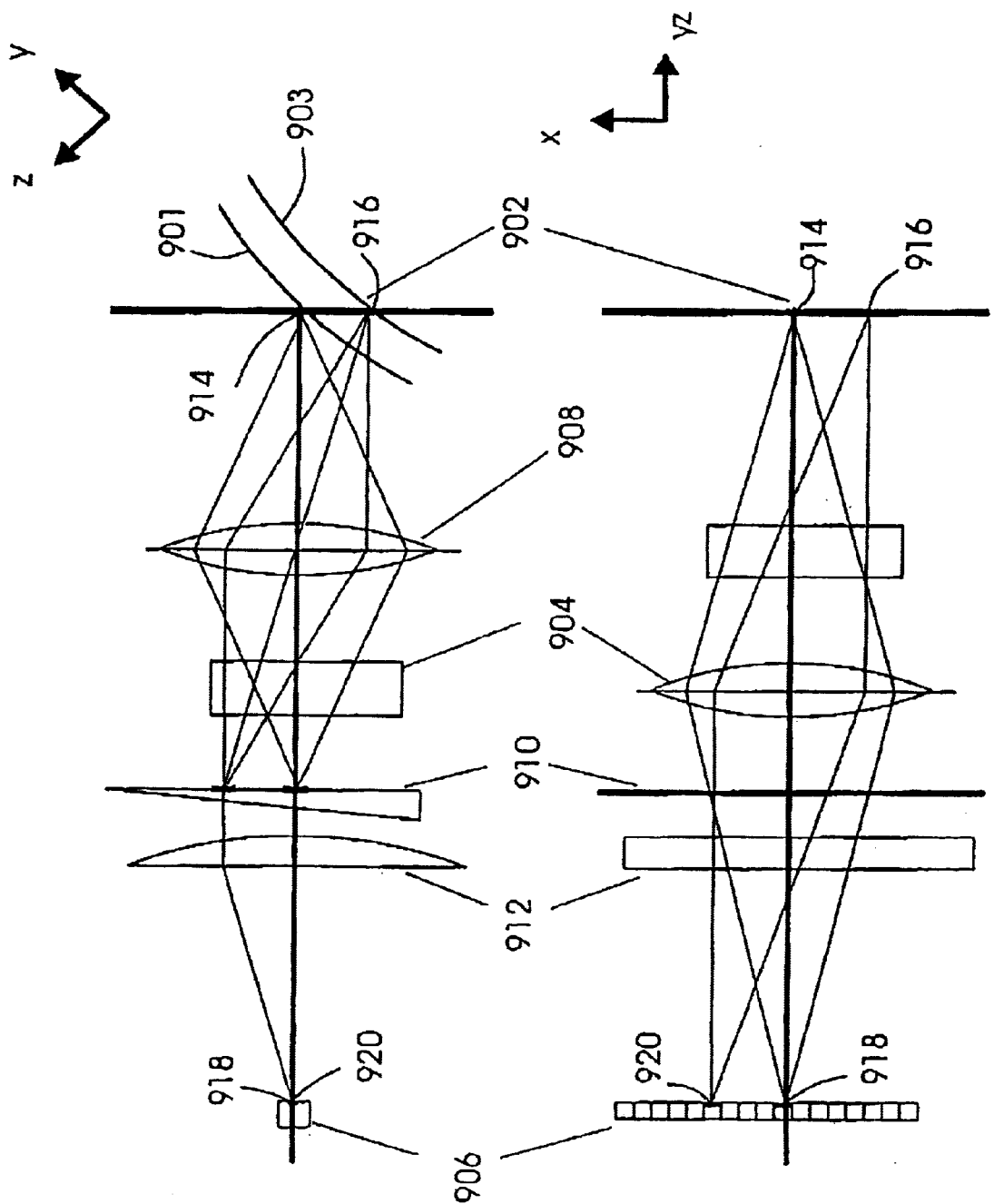

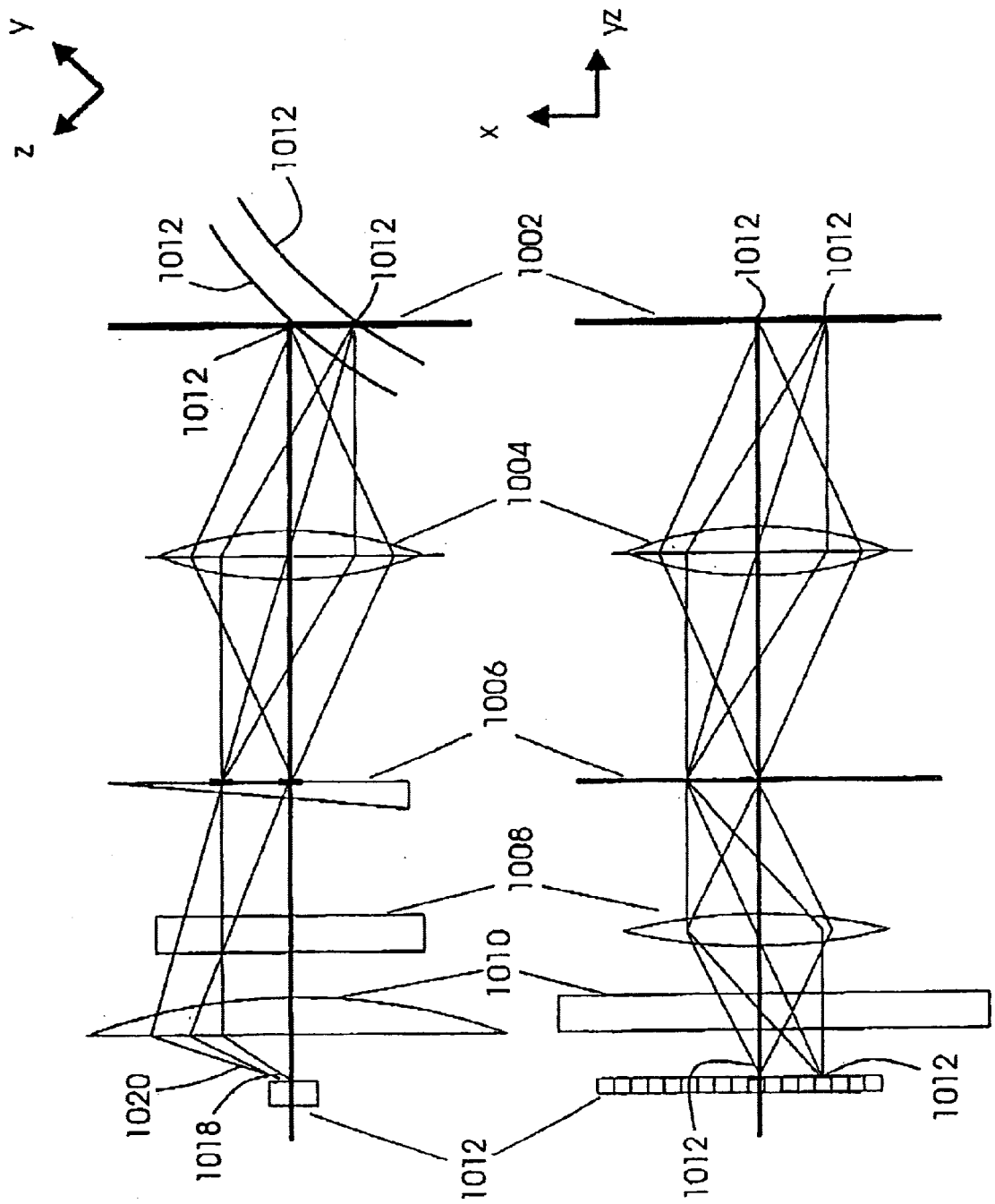

PARALLEL-PROCESSING, OPTICAL DISTANCE-MEASURING DEVICE

BACKGROUND OF THE INVENTION

The present invention is directed to a device for determining the positional deviation of n points, n being a natural number, from their n disjunct reference positions, using an electromagnetic radiation source, imaging optics, and a photosensitive detector, the positional information being converted into information on intensity.

To image flat or curved printing forms, whether it be in a printing-form imaging unit, in a print unit, or in a printing press, arrays of light sources, typically lasers, are used. With the array, which is usually oriented perpendicularly to the straight lines defined by the optical axis of the imaging optics, one produces a number n of individual light beams, whose image points from light sources, such as laser diodes, formed through an optical lens system, are distributed over a surface of a plurality of millimeters times micrometers, situated for the most part on a plane or even straight lines, on the printing form. A point or image point is understood in this context to be both a mathematical point, as well as a multi-dimensional, limited surface. The image points of an individual beam usually have a diameter of several micrometers, and they are spaced apart by several 100 micrometers. Often, the printing form does not abut so as to be flat against the base, be it a flat or curved surface, because the base is soiled by powder dust, other dust particles, or the like. Rather, local bulges having a diameter of several millimeters can form. The imaging optics of the array, both those which are identical for all n beams, as well as the individual ones, are generally configured such that the reference positions of the image points, in other words, their desired position at a reference distance to the optical lens system, are substantially located in one plane. However, because of the bulges, it necessarily follows that image points of individuals beams lie in a plane other than the plane which is defined by the reference position and which is perpendicular to the straight line defined by the optical axis of the imaging optics. To achieve a desired imaging result at these locations in the image field as well, depending on the method employed, one must either change the optical power for the affected light sources in the array, or, however, particularly when the image points in the reference position are a question of the beam waist of the light source, one must shift the focus of the imaging optics, either by varying the object distance, the image distance, or by shifting the main planes of the imaging optics. In both cases, one must determine the position of the current image point with respect to its reference position, since this quantity is needed as an input value to calculate the required change in power or the required variation in the imaging optics. Typically, the result of a ranging or distance measurement of this kind is used to generate a control signal. A control signal can be produced, for example, by further processing a signal from a photosensitive detector, thus from a measurement of light intensity. Optical distance-measuring devices are used, in particular, in autofocusing devices.

U.S. Pat. No. 4,546,460 describes an autofocusing device for an optical system having a laser as a light source, a light-reflecting surface, and a photodetector having at least two photosensitive regions. The laser beam is converged through an objective lens and projected onto the light-reflecting layer. The laser light reflected off of the layer is projected through the objective lens and other optical components onto the surface of the photodetector. In response to displacement of the objective lens along the optical axis, the laser beam is deflected, and the pattern projected onto the surface of the photodetector moves in a specific direction. When the objective lens lies at a distance shorter than a predetermined distance from the light-reflecting layer, the pattern is formed on the first photosensitive region. When the objective lens is located at a distance greater than the second predetermined distance, the pattern is likewise formed on the first photosensitive region. When the objective lens is located at a distance greater than the first predetermined distance and shorter than the second predetermined distance from the light-reflecting layer, the pattern is formed on the second photosensitive region of the photodetector. From the determination of the position of the pattern, one can deduce the distance of the light-reflecting layer to the optical system. Moreover, the focus of the imaging optics can be shifted by shifting the objective lens.

A system of this kind has the drawback of only allowing the position of one single point to be determined with respect to a reference position, and one single focus to be shifted.

U.S. Pat. No. 5,302,997 describes, for example, an arrangement of photometric and range finding elements in an array for use in automatic focus control and automatic exposure measurement for an associated optical system. The arrangement has a two-dimensional, photosensitive element in the center and, on either side thereof, a linearly disposed number of photosensitive elements in an image field. A lens system is provided for projecting an image onto the arrangement. In this context, the photosensitive elements disposed in a linear array receive light from a fractional portion of the image field and are used to measure the intensity of the light received, while the two-dimensional photosensitive element is composed of a number of individual regions and is used to generate a signal for automatic focus adjustment.

Here again, the disadvantage of this arrangement is that only the position of one single point is employed in focus control. Although an array of photosensitive elements is provided for measuring intensity, the corresponding signals are only employed in automatic exposure measurement.

The described devices are not suited for determining the deviation of the position of n image points from their reference positions for the n light sources of an array, in particular from lasers, since the n image points cannot be spatially resolved, and only one signal is produced for the entire image field. Successively measuring n deviations or distances implies an n-fold measuring time. This is not acceptable for the desired purpose of the application, particularly with respect to a device for forming an image on printing forms.

SUMMARY OF THE INVENTION

An object of the present invention is, therefore, to provide a device for determining the deviation of the position of n points from their n disjunct reference positions, which will render possible high-speed measurements of the n deviations or distances.

The present invention provides a device for determining the positional deviation of n points (P), n being a natural number, from their n disjunct reference positions, using a source of electromagnetic radiation (1), imaging optics (2, 4, 9), and a photosensitive detector (10), with the positional information being converted into information on intensity. Substantially simultaneous or concurrent in time n signals are produced by the detector (10), each of the n signals being uniquely assigned to one of the n points (P).

The present invention also provides a method for determining the positional deviation of n points (P) from their n reference positions, n being a natural number, comprising the following steps: illumination of each individual one of the n points (P) using electromagnetic radiation; conversion of the positional information on points (P) into path information on the light radiation; conversion of the positional information into intensity information; and discriminating detection of the reflected light from at least two of the n points (8); wherein the method steps are carried out simultaneously or concurrently in time for all n points (8).

In the device according to the present invention for determining the deviation of the position of n points from their disjunct reference positions using a source of electromagnetic radiation, imaging optics, and a photosensitive detector, simultaneous or concurrent n signals are produced by the detector, each of the n signals being uniquely allocated to one of the n points. To this end, light emanating from a light source is radiated through a suitable imaging optics onto the surface of n points, and is at least partially reflected off of the surface of n points. The reflected light is directed through an appropriate imaging optics to a photosensitive detector. Depending on the intensity of the incident light, a signal is produced, typically in electric form. As a result, a measurement of n points or points of reflection can be advantageously taken within a specific time. Using the device of the present invention, one can achieve a high-speed and simple measurement and generation of n signals, which can be utilized to either regulate the intensity of the light source in an array that is employed in an imaging device, in particular for printing forms, or, however, to change the focal positions of corresponding imaging optics for the imaging device, including the array. A device of this kind can be implemented in compact form and, likewise, entails low costs, since only one source of electromagnetic radiation is used. At the same time, the position of n points or points of reflection can be determined with proper resolution.

One of the aims of the present invention is to facilitate a rapid, spatially-resolved detection of surface unevenness on a printing form to be imaged, in particular to create a device suited for converting information on the printing form's surface unevenness into a directly or indirectly detectable change in the position of a light beam or of a region of a light beam.

In one preferred specific embodiment, the source of electromagnetic radiation is a single source which emits coherent or incoherent radiation and whose light, when passing through one part of the imaging optics, impinges upon all n points, whose positional deviation from their disjunct reference positions is to be determined. The photosensitive detector has a number n of mutually independent photosensitive elements. Assigned to each of the n, mutually independent photosensitive elements is exactly one point or point of reflection, whose positional deviation with respect to the reference position is to be determined. Here, it is a question, in particular, of a distance deviation. In other words, the imaging through a further section of the imaging optics, following reflection of the light off of the reflecting surface, in whose area the n points lie, is conceived such that the light reflected off of the region of one of the n points, clearly follows from one of the n, mutually independent photosensitive elements. The deviation in the position of one of n points from its reference position leads to a different light path than the path of the light reflected from the point, through the imaging optics, into the reference position. In this manner, positional information is converted into path information. At least one element is provided in the imaging optics for converting the path information for each light path through the imaging optics associated with one of the n points, into information on light intensity. Particularly beneficial in this regard is the use of an optical element having a positionally dependent transmission, whether it be continuously or discretely positionally dependent. In other words, the device of the present invention for determining the deviation of the position of n points from their n disjunct reference positions can also be described as a parallel-processing, optical distance-measuring device.

The device of the present invention for determining the deviation of the position of n points from their disjunct reference positions can be conceived such that an imaging optics is employed which emanates from a source of electromagnetic radiation and has a plane of symmetry that runs in parallel to the optical axis of the imaging device. Alternatively thereto, it can be advantageous for the device of the present invention to be conceived such that its imaging optics projects a collimated beam that is obliquely incident to the printing form, onto a detector. As a function of the displacement of individual regions of the printing form out of the focusing position, points of intersection between the illuminating beam and the printing form can assume different spatial locations. The reflected beam is projected such that the spatial information pertaining to one direction, typically the direction of the cylinder axis, is retained when the printing form is mounted on a rotationally symmetric element, and such that the spatial information pertaining to a direction perpendicularly thereto, defined by the position of the n points, is converted to information on intensity.

BRIEF DESCRIPTION OF THE DRAWINGS

Other advantages and beneficial further refinements of the present invention are presented on the basis of the subsequent figures and descriptions thereof, in which:

FIG. 8 shows in an alternative specific embodiment of the device of the present invention, a schematic representation of the optical path of rays in the imaging optics section that is arranged downstream from the carpet of light;

FIG. 9 shows a schematic representation of first advantageous further refinement of the alternative specific embodiment of the device of the present invention;

FIG. 10 shows a schematic representation of a second advantageous further refinement of the alternative specific embodiment of the device of the present invention.

DETAILED DESCRIPTION

Figure 1:
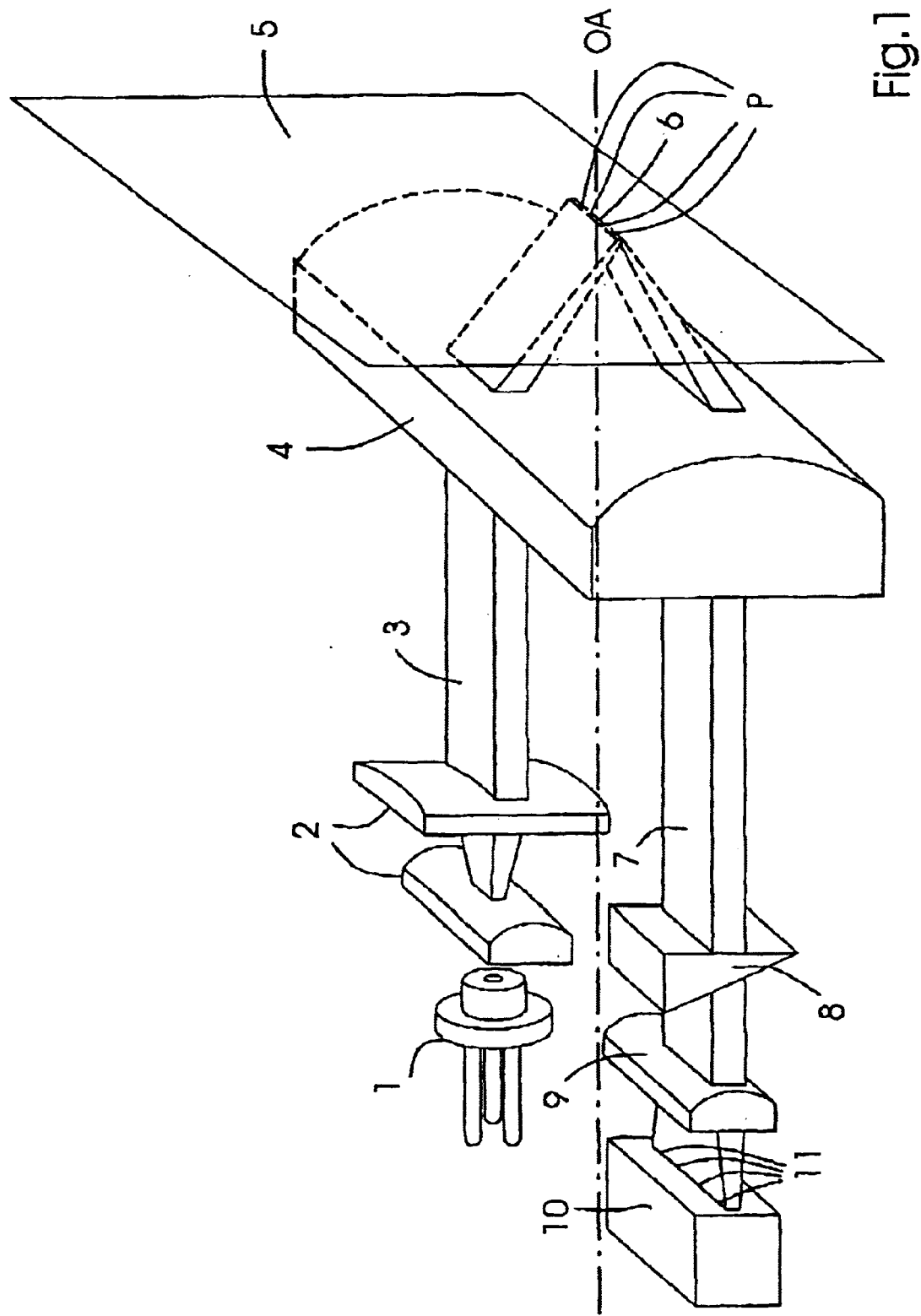
FIG. 1 shows a schematic representation of the optical path of rays through an advantageous specific embodiment of the device of the present invention.

FIG. 1 depicts an advantageous specific embodiment of the device of the present invention in a schematic representation of the optical path of rays. In a preferred specific embodiment, light source 1 is a diode laser. The light emanating therefrom is transformed by a first imaging optics 2, advantageously including non-rotationally symmetric, aspherical optical elements, such as cylindrical lenses, into a laser beam 3, whose width, defined by the n image points P, in this case four, of the imaging device (not shown here), typically a diode laser array, is selected to cover the recording surface, and whose height is selected such that the beam divergence along the propagation can be disregarded. The laser beam is focused off-axis through a lens optics, here a cylindrical lens 4, onto printing form 5, so that a narrow carpet of light 6 is imaged thereon. FIG. 1 shows a flat printing form. Without limiting universality, however, it can just as well be a printing form having a macroscopically curved surface. This curvature, considered microscopically or locally, can be disregarded for the optical imaging of the device of the present invention. The laser deviation of a point is, therefore, in particular a deviation in the distance to a reference plane. The width of carpet of light 6 corresponds to the width of the writing surface on printing form 5 defined by n image points P of the imaging device. The light reflected off of printing form 5 is collimated by lens optics 4 and transformed into laser beam 7. Laser beam 7 impinges on an optical element having a positionally dependent transmission, preferably on an optical wedge 8. The transmission of optical wedge 8 is dependent on the distance to optical axis OA of the imaging system. Typically, the transmission for small distances is greater than it is for large distances. The refraction at entrance or emergence of the light is negligible for this optical element. The transmitted and, as the case may be, intensity-attenuated light, is focused through a focusing optics, in this case cylindrical lens 9, onto a photosensitive detector 10. In a preferred specific embodiment, photosensitive detector n has n photodiodes 11.

When the device is in operation, carpet of light 6 on printing form 5 can also be situated at a spatially separate location of the n image points of the light sources of the imaging device. Printing form 5 is then relatively movable, so that a point of its surface initially falls under carpet of light 6, which has the dimensions of the surface defined by n image points, and then under the surface of n image points P of the imaging device. Since the translation or rotation parameters are known, the current distance at the time of the imaging operation can be deduced from the preceding measurement.

The geometric configuration shown in FIG. 1 constitutes only one advantageous specific embodiment of the present invention. Other optical elements are also advantageously conceivable, in particular for use in beam formation. In this context, reflecting optical elements have proven to be efficient.

Figure 2:
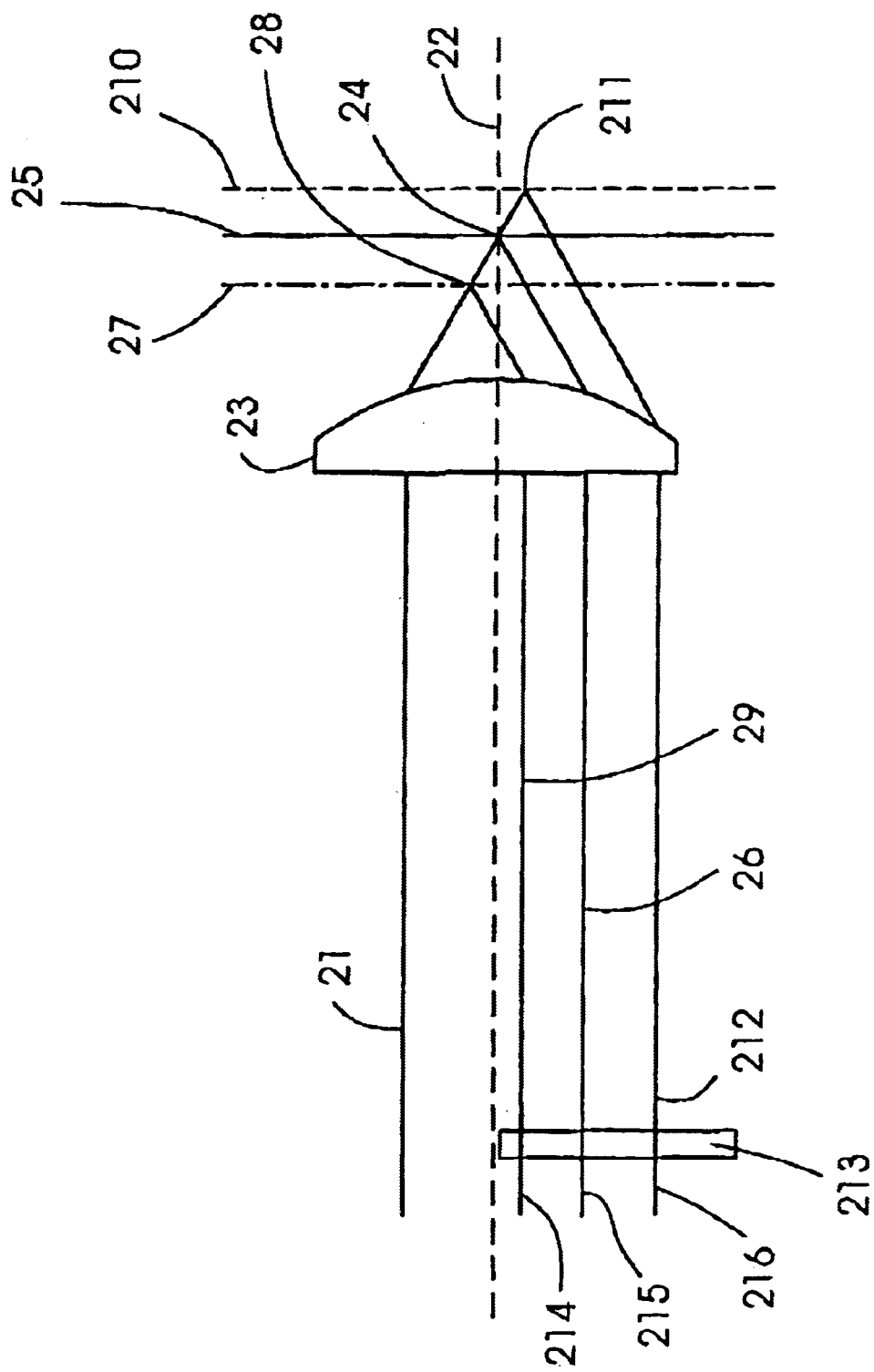
FIG. 2 shows a schematic representation to clarify how the positional deviation of a point of reflection leads to different light paths through an advantageous specific embodiment of the device of the present invention.

FIG. 2 is a schematic representation clarifying how the positional deviation of the printing form and, thus, of the points of reflection, leads to different light paths through the device of the present invention. For the sake of simplification of the argumentation and without limiting universality, only one sagittal section through the device of the present invention is shown, thus perpendicularly to the straight line defined by light section 6. Coming from the left, light beam 21 propagates in parallel to optical axis 22. It is refracted by lens 23 towards optical axis 22. Provided as the operating point or reference position is the point of intersection of plane 25 with optical axis 22. It is generally the case that when the semiaxes of light beam 21 differ in the meridional and sagittal directions, carpet of light 24 is formed on plane 25. The light reflected off of plane 25 is transformed, in turn, by lens 23 into a beam 26, which propagates in parallel to optical axis 22. Light beam 21 refracted by lens 23 intersects a plane 27, which lies between lens 23 and reference plane 25, in carpet of light 28. The light reflected by carpet of light 28 is transformed by lens 23 into a beam 29, which propagates in parallel along optical axis 22. Beam 29 is at a closer distance to the optical axis than is beam 26. A plane 210, which is at a further distance from lens 23 than plane 25, is intersected by light beam 21 refracted by lens 23 in carpet of light 211. The light emanating from carpet of light 211 is transformed by lens 23 into a beam 212, which propagates in parallel along optical axis 22. Beam 212 is at a is further away from the optical axis than is beam 26. From FIG. 2, it is apparent that in a configuration of this kind, the position, thus the distance of the planes in front of and behind reference plane 25, is in a functional relationship with the distance of the parallel beams, which emerge from the imaging optics and into which the light reflected off of the planes is transformed, to optical axis 22. In other words, the positional information on planes 27 and 210, respectively, to reference plane 25 is transformed into path information on the distance of parallel beams 26, 29, and 212. This path information can be encoded in the light intensity of beams 26, 29, and 212 by an optical element 213, which exhibits a transmission that is dependent upon the distance to optical axis 22. For example, after passing through the optical element having positionally dependent transmission 213, light beam 214 advantageously exhibits less intensity than light beam 215, which, in turn, exhibits less intensity than light beam 216. In other words, the path information contained in the position of the parallel beams with respect to the optical axis is converted into intensity information, so that light beams 214, 215, and 216 can be projected through an imaging optics (not shown here) onto a detector (not shown here), information on the position of the reflection plane being retained.

In accordance with the preferred specific embodiment of the device of the present invention shown in FIG. 1, the transformation of positional information into intensity information, as explained on the basis of FIG. 2, can be carried out concurrently for all n points P. To this end, the optical imaging system in FIG. 1 is an imaging optics which produces a carpet of light 6 on printing form 5, exhibiting different semiaxes in the sagittal and meridional directions. In this instance, the surface of carpet of light 6 covers the surface defined by n image points P of the imaging device. The reflected light from light section 6 is projected through the imaging optics onto a detector surface 10, and portions of this surface are assigned to one of n photodiodes 11. In other words, the projected image of light section 6 on the detector is discretized into at least n components, so that the system discriminates among individual regions in which two of the n points lie in each case. Uniquely assigned, in this context, to each component is one of n image points P of the light sources of the imaging device. Signals which are substantially simultaneous or concurrent in time are produced by the detector, i.e., particularly within the scope of the detector's response, each of the n signals being uniquely assigned to one of the n points. If portions of light section 6 are now at different distances to lens optics 4, in other words the reflection takes place in planes whose position deviates from the that of the reference plane, then, within the device of the present invention, the relevant intensity information, which is in a functional relationship, is assigned to these portions. In this manner, a parallel-processing, optical distance-measurement is rendered possible.

Figure 3:
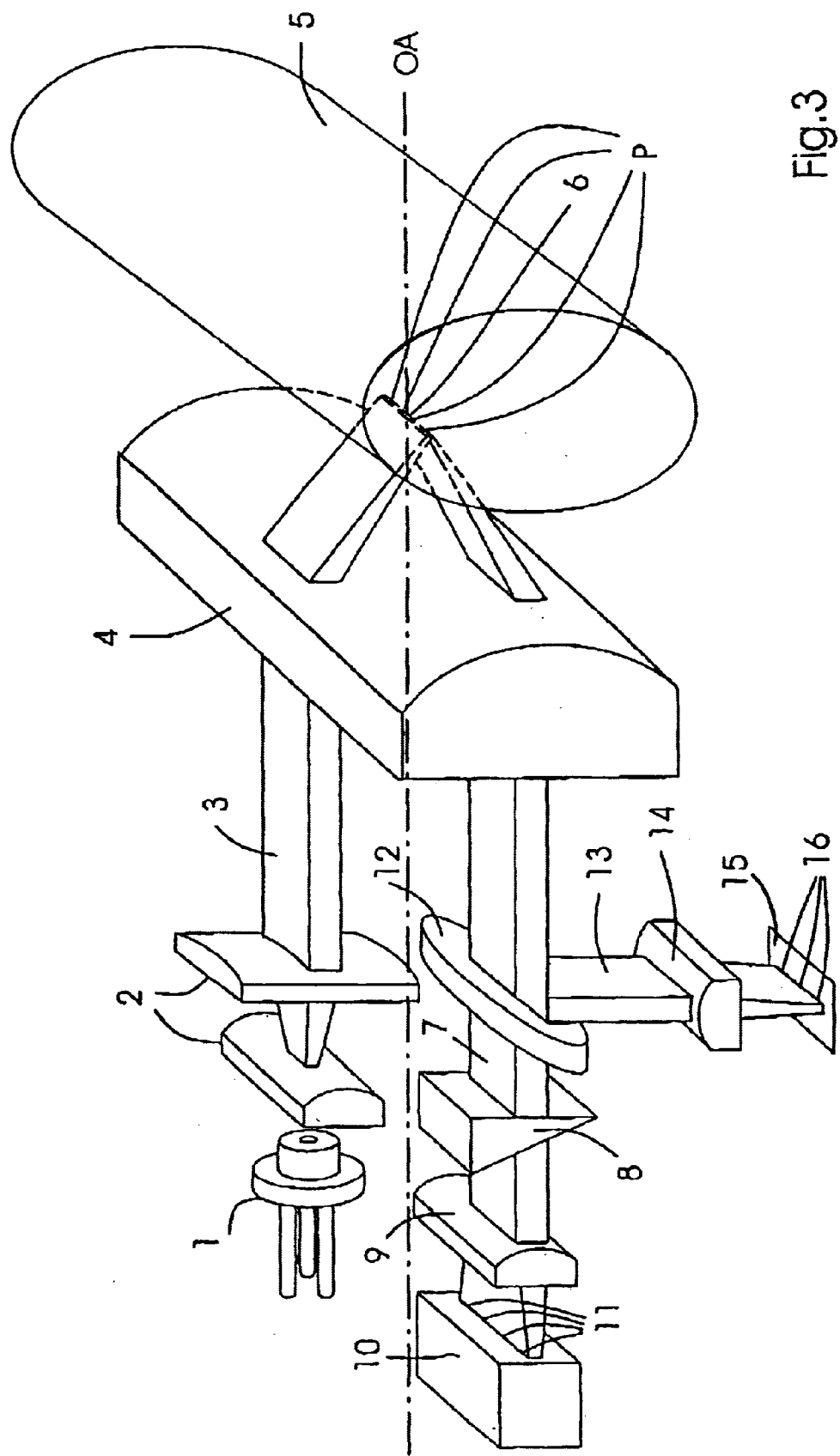
FIG. 3 shows a schematic representation of an advantageous specific embodiment of the device of the present invention, including an additional device for determining the intensity of the reflected light.

FIG. 3 depicts an advantageous further refinement of the device of the present invention. The device of the present invention is schematically shown in FIG. 3, including additional optical elements for determining the intensity of the light reflected off of the printing form. First of all, FIG. 3 illustrates elements 1 through 11 already shown in FIG. 1. In addition, inserted into the light path of laser beam 7 is a beam splitter 12, which couples out a light beam 13. This light beam 13 is projected by a cylindrical lens 14 onto a further photosensitive detector 15. Photosensitive detector 15 has n photodiodes 16. Beam splitter 12 can exhibit any known splitting ratio between the transmitted and reflected beam. An essential point to be considered in this configuration is that, independently of the position of printing form 5 relative to lens optics 4 and, thus, independently of the position of light section 6, which leads to different light paths of the reflected radiation, a specific reflected intensity, thus that of light beam 7, can be determined from the splitting ratio of beam splitter 12 and from the known intensity of the light emitted by light source 1. A control signal, which is independent of the existing power of the reflected beam that is a function, in particular, of the active optical power of light source 1, can be produced from the signal of photosensitive detector 10 by forming the quotient of the intensity signal from corresponding photodiodes 11 and 16.

Figure 4:
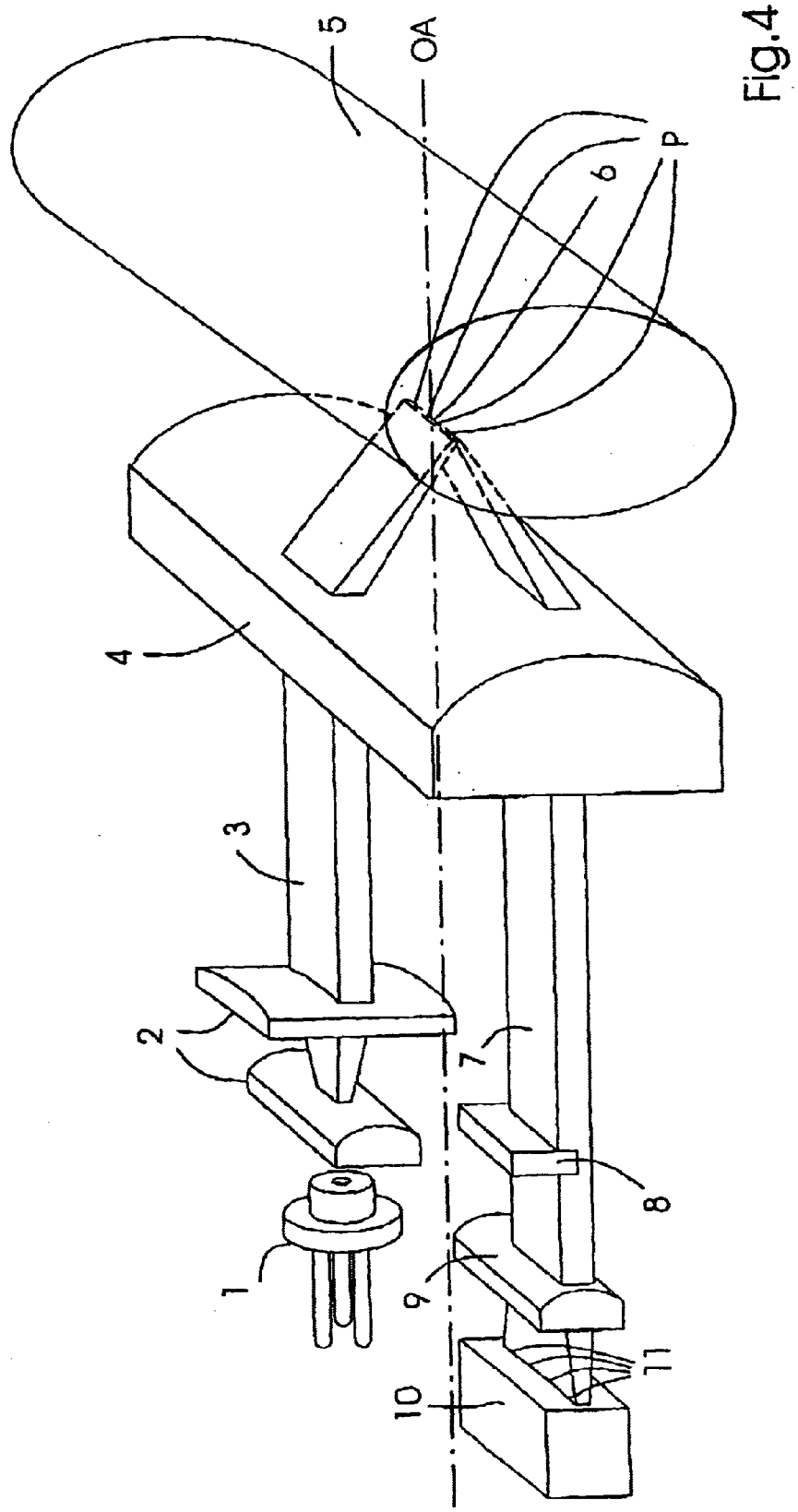
FIG. 4 shows a schematic representation of an alternative advantageous specific embodiment of the device of the present invention, including an optical element having a steplike transmission as a function of the spatial position.

FIG. 4 schematically illustrates an alternative specific embodiment of the device of the present invention, including an optical element having a steplike transmission as a function of the distance from the spatial axis. Particularly beneficial is a steplike transmission of 0 and 1. To utilize a transmission of this kind, light beam 7 is widened such that, when reflected at light section 6 of printing form 5 into the reference position, half of the light beam is blocked by transmission stage 0. As already mentioned, a positional deviation of the reflection plane is transformed into positional information on the reflected parallel beam. Thus, depending on the distance of the reflected parallel beam to optical axis OA, a larger or smaller portion of the entire light beam is blocked by transmission stage 0. In this manner, intensity information is impressed on the light beam. Since the entire transmitted light is projected onto a detector, thus is bundled, coherent effects, such as diffraction at the edge, the intensity modulation in accordance with the Fresnel's integral, are negligible in the case of coherent light.

Depending on whether the optical element having a positionally dependent transmission has a steplike transmission characteristic, i.e., one that changes over a spatially small area, e.g., a knife edge or a half-side coated mirror having a narrow transition region between the transmitting and non-transmitting part—or an optical wedge having a wide transition region, one can select the height of the light section used to illuminate the printing form. In the case of the knife edge, the height of the light section should be selected such that, even given maximal deflection of the printing form, the knife edge divides the image of the light section in the detection plane, i.e., between 1% and 99% is always transmitted. If an optical wedge is provided, the height of the illuminating beam can be low, so that the entire light section always passes through the optical wedge, enabling its position to be determined as precisely as possible on the basis of the grey scale value.

Any laser type can be used as light source 1. One preferred specific embodiment provides for a diode laser or solid-state laser to be used. Alternatively, however, a light source of incoherent light can be used. The wavelength of the luminous radiation is advantageously efficiently reflected by the printing form. In one preferred specific embodiment, the wavelength lies in the red spectral region, for example 670 nm. It is customary for the laser to be used in continuous-wave mode. However, a pulsed mode is advantageous to reduce sensitivity to other, undesired reflections.

Other optical elements, such as spherical and aspherical lenses, anamorphotic prisms, mirrors and the like can be added to the schematic topology and geometry of the imaging optics shown in the figures to provide an advantageous beam formation of light beam 3 and/or of light beam 7.

In an advantageous further refinement of the present invention, the control signal is decomposed into an average value, which is calculated from the sum of the intensity measured on the n photodetectors. The average value is then used as a global control value for moving the focusing line of the imaging device. The difference between the control signals of the individual photodiodes and the average value is used as a control signal for the individual lasers of the laser array of the imaging device.

In a further alternative specific embodiment, the number of photodiodes in the photosensitive detector can also be smaller than the number of laser beams of the imaging device. In this case, the control signal, which is generated from the intensity received at a specific photodiode, is used as a control signal for a plurality of adjacent laser beams. When the number of photodiodes in the photosensitive detector is greater than the number of laser beams of the imaging device, the average value of a plurality of control signals of adjacent photodiodes can be employed, for example, for one laser beam. Thus, one can select the previously mentioned discretization of the light section image to be less than or greater than that given by the number n of the light sources of the control device.

In a further advantageous refinement of the present invention, microoptical components are used. For example, the focusing cylindrical lenses 9 and 14 can be assembled from a plurality of optical components and include an array of lenses.

To prevent laser radiation of the imaging device from irradiating the photosensitive detectors of the device of the present invention, an appropriate optical band-pass filter is advantageously provided, which only transmits the wavelength of light source 1 used to produce the points of reflection in the parallel-processing, optical distance-measuring device. One alternative specific embodiment of the present invention provides for photosensitive detectors, which include photocells, photomultipliers, or charged coupled displays (CCD).

A device of this kind according to the present invention can be designed to be separate from the imaging device of the printing form or, however, to be fully or partially integrated with it. In other words, components of the imaging optics of the imaging device and of the device of the present invention can be jointly used.

Figure 5:
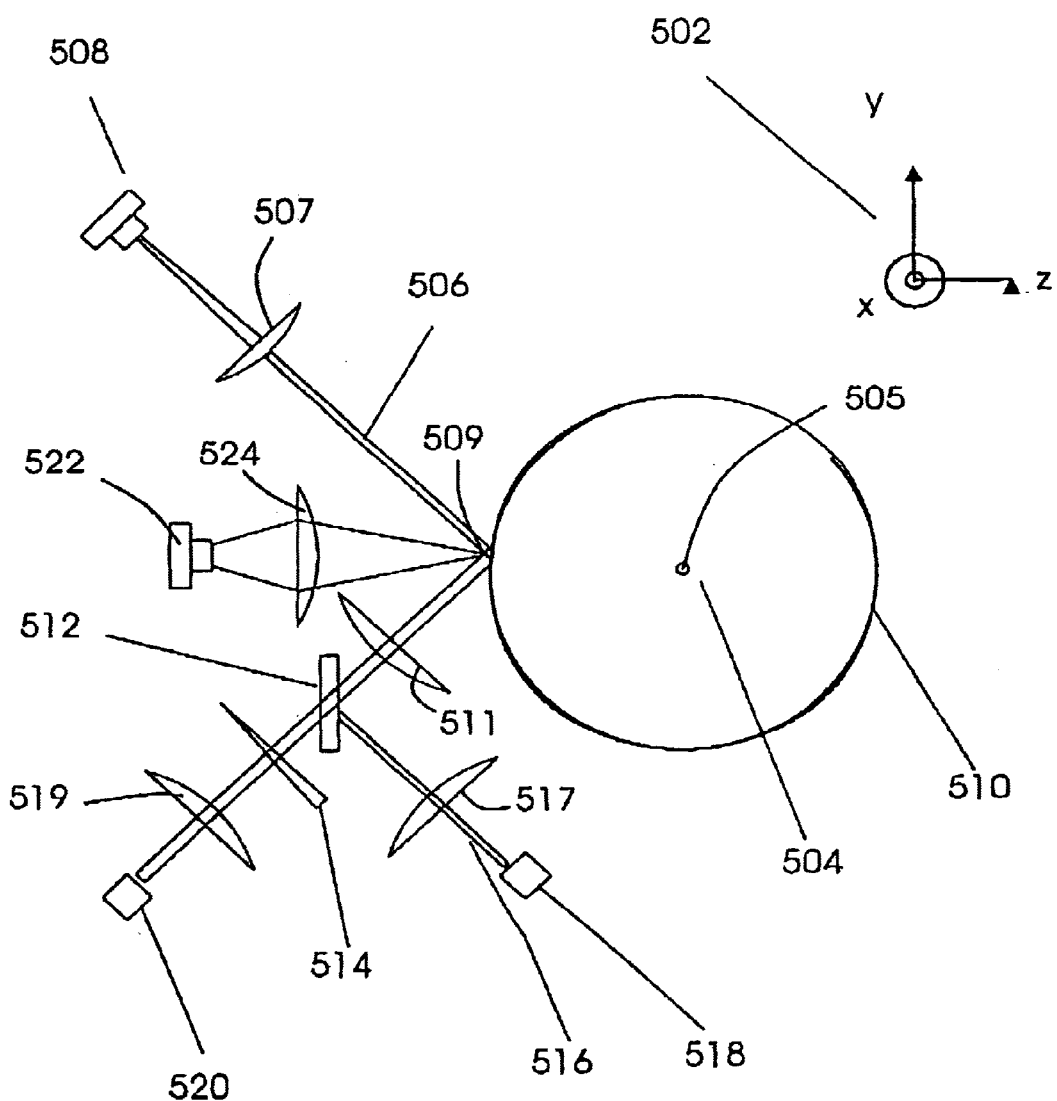
FIG. 5 shows a schematic representation of the optical path of rays through an alternative specific embodiment of the device of the present invention, including an obliquely incident, collimated illuminating beam.

FIG. 5 schematically illustrates a representation of the optical path of rays through an alternative specific embodiment of the device of the present invention. A coordinate system 502 including Cartesian coordinates x, y and z designates the position of a cylinder 504, for example in a so-called external drum printing-form imaging unit or in a direct-imaging printing press. Axis of rotation 505 is in the x direction; the z direction is defined through the optical axis, along which the light propagating from an imaging light source 522 impinges on a printing form 510, which is accommodated on cylinder 504, and the y direction denotes the third spatial direction, perpendicularly to the x and z directions. An illuminating beam 506, typically the collimated beam from a light source 508, for example a laser, is projected by a cylindrically symmetric optics 507 onto printing form 510. The projection of illuminating beam 506 forms a carpet of light 509 on printing form 510. This carpet of light 509 is preferably a rectangular, preferably homogeneously illuminated region, which corresponds in width to the region to be detected. Illuminating beam 506 preferably impinges at an angle of 45 degrees on printing form 510 and is reflected at a right angle to its incidence direction. Carpet of light 509 is projected by an intermediate optics 511 into a conversion plane 514. Located in this conversion plane 514 is an optical element having positionally dependent transmission. A further imaging optics 519 follows for focusing onto a photosensitive detector 520. In addition, in one advantageous further refinement, as shown in FIG. 5, a beam splitter 512 can be introduced prior to conversion plane 514 into the optical path of rays. On an identical path of rays 516, a portion of the light is coupled out by an imaging optics 517 onto a photosensitive detector 518.

Figure 6:
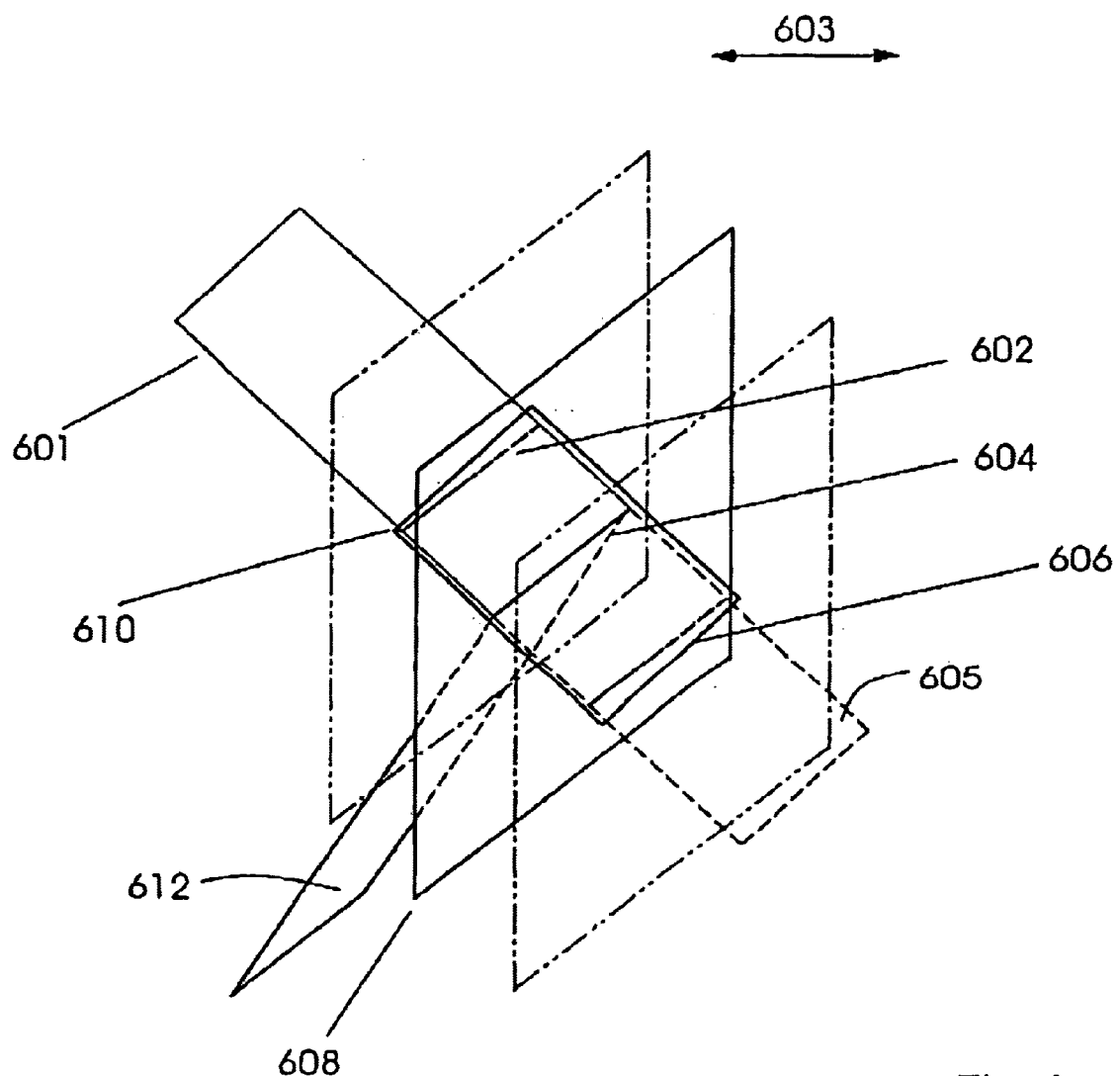
FIG. 6 shows a schematic representation for producing a carpet of light as a reflection line on the printing form.

FIG. 6 schematically illustrates how a carpet of light is produced as a reflection line on the printing form, and how the positional information is transformed into path information on the reflected light. Depicted in FIG. 6 is an illuminating beam 601, which impinges here, by way of example, at an angle of 45 degrees on a printing form and is reflected essentially at a right angle to the incidence direction. The printing form can have different positions in the z direction, i.e., in normal direction 603. In a first position of printing form 608, a first line of intersection 602 is produced; in a section position of printing form 609, a second line of intersection 604 is produced; and, in a third position of printing form 608, a third line of intersection 606 is produced. The situation is shown by way of example in FIG. 6, in which printing form 608 is in a position, in which illuminating beam 601 is reflected as beam 612 in line of intersection 604. Without printing form 608, the beam would continue as illuminating beam 605. The three lines of intersection 602, 604, and 606 lie in a linear plane 610. In other words: If printing form 608 varies its position in the z direction, thus in normal direction 603, then the possible positions of line of intersection 602, 604 or 606 form a plane in the space which is defined by the incidence direction of the illuminating beam and by one of the lines of intersection, for example second line of intersection 604.

Figure 7:
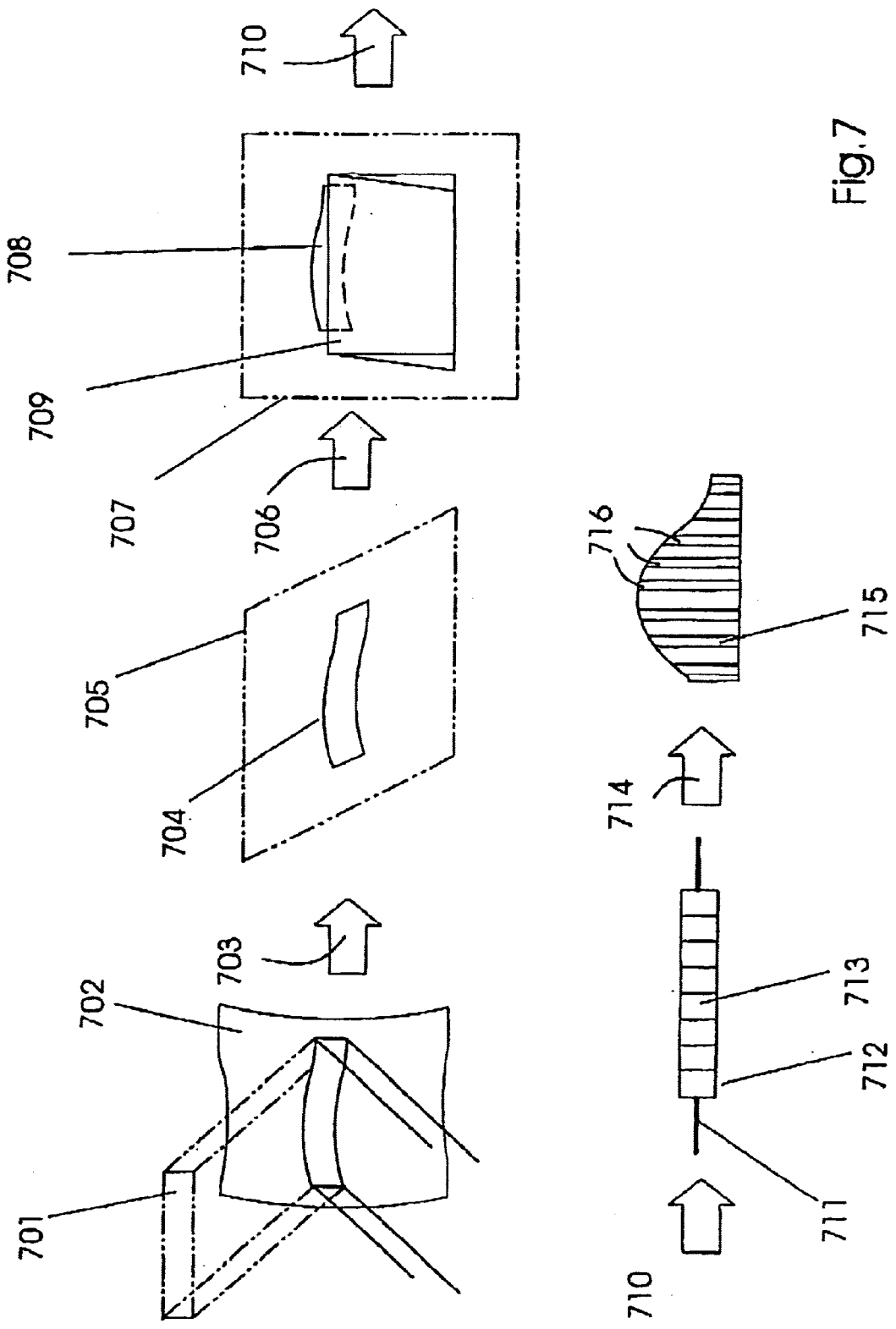
FIG. 7 shows a schematic representation for elucidating the conversion of spatial information into intensity information, in the device of the present invention.

The conversion of spatial information into intensity information in the device of the present invention is explained on the basis of a schematic representation in FIG. 7. FIG. 7 shows schematically how a light section 702 is situated on a printing form 701. Through the reflection transformation, as indicated by the arrow, the position of light section 702 is transformed into path information pertaining to reflected beam 704 in linear plane 705. An imaging transformation 706 transfers this information to conversion plane 707 as an image patch 708. Conversion plane 707 has an optical element including a positionally dependent transmission 709. This effects an intensity transformation 710 such that, in a detection plane 711, a specific light intensity is measured on photodiodes 713 of a photosensitive detector 712. A signal transformation 714 is produced to generate a brightness signal 715 as a function of the measurements of individual photodiodes 713. Thus, signals 716 are generated for individual regions within the light section as a function of the position. The information contained in brightness signal 715 can then be transferred in serial or parallel operation, as a control signal, to a device which adapts the optical parameters of the imaging beam to the irregularities of the printing form.

FIG. 8 schematically shows a representation of the optical path of rays in one specific embodiment of the part of the imaging optics downstream from the carpet of light. Partial illustration 8a shows a section in the yz plane, while partial illustration 8b shows a section along the x coordinate. Partial illustration 8a depicts a first position of printing form 801 and a second position of printing form 803, as well as a linear plane 802, which exhibits two points of intersection: a first point of reflection 812 and a second point of reflection 814. A rotationally symmetric imaging optics 804, preferably a spherical lens, first point of reflection 812 and second point of reflection 814 are projected into a conversion plane 806. Located in this conversion plane 806 is an optical element having positionally dependent transmission. From there, an additional, rotationally symmetric imaging optics projects the image onto a photosensitive detector 810, a first detection point 816 being assigned to first point of reflection 812, and a third detection point 820 being assigned to second point of reflection 814. Partial illustration 8b shows the situation alternatively in a section along the x coordinate, including a first detection point 816 and a second detection point 818.

FIG. 9 shows a schematic representation of a first advantageous further refinement of the alternative specific embodiment of the device of the present invention. Partial illustration 9a depicts a section in the yz plane, and the situation is shown in partial illustration 9b along the x axis. In a first position 901, the surface of the printing form intersects a linear plane 902 at a first point of reflection 914, while in a second position 903, the surface of the printing form intersects linear plane 902 in a second point of reflection 916. First point of reflection 914 and second point of reflection 916 are projected by an at least two-part imaging optics made up of a first cylindrically symmetric imaging optics 904 and of a second cylindrically symmetric imaging optics 908, onto a conversion plane 910, in which an optical element having positionally dependent transmission is located. In this context, the axes of symmetry of first cylindrically symmetric imaging optics 904 and of second cylindrically symmetric imaging optics 908 are essentially perpendicular to one another. A third cylindrically symmetric imaging optics 912 is used to project first point of reflection 914 into a first detection point 918, while second point of reflection 916 is projected into a second detection point 920. In the representation of partial illustration 9a of FIG. 9, these points coincide. Partial illustration 9b of FIG. 9 shows, in a depiction of the section in the x direction, how the image formation in the x and yz directions are separate from one another. A beam coming in this direction from first point of reflection 914 is influenced by first cylindrically symmetric imaging optics 904 and imaged into first detection point 918. Correspondingly, light emanating from second point of reflection 916 is imaged by first cylindrically symmetric imaging optics 904 into a second detection point 920.

FIG. 10 shows a schematic representation of a second advantageous further refinement of the alternative specific embodiment of the device of the present invention. Partial illustration 10a of FIG. 10 shows a section in the yz plane, while partial illustration 10b of FIG. 10 shows a section in the x direction. In a first position 1001, the surface of the printing form intersects a linear plane 1002 at a first point of reflection 1014, while in a second position 1003, the surface of the printing form intersects linear plane 1002 in a second point of reflection 1016. First point of reflection 1014 and second point of reflection 1016 are imaged by a rotationally symmetric imaging optics 1004 into a conversion plane 1006. Located in this conversion plane is an optical element having positionally dependent transmission. From there, an at least two-part imaging optics, made up of a first cylindrically symmetric imaging optics 1008 and of a second cylindrically symmetric imaging optics 1010, whose axes of symmetry are essentially perpendicular to one another, projects into a detection plane 1012. First detection point 1018, which corresponds to first point of reflection 1014, and second detection point 1020, which corresponds to second point of reflection 1016, coincide in this plane. In partial illustration 10b of FIG. 10, a section is shown in the orthogonal, thus in the x direction. A first point of reflection 1014 and a second point of reflection 1016 are imaged by a rotationally symmetric imaging optics 1004 into conversion plane 1006. From there, first cylindrically symmetric imaging optics 1008 effects an imaging of first point of reflection 1014 onto a first detection point 1018, and an imaging of second point of reflection 1016 onto a second detection point 1020.

A device of this kind in accordance with the present invention can be used both in a printing-form imaging unit, as well as in a print unit or a printing press, in particular in direct-imaging print units or printing presses.

Simultaneous or concurrent in time as defined in the claims means substantially simultaneous or concurrent.

Reference Symbol List
P point
OA optical axis
1 light source
2 imaging optics
3 laser beam
4 lens optics
5 printing form
6 carpet of light
7 laser beam
8 element having positionally dependent transmission
9 cylindrical lens
10 photosensitive detector
11 photodiodes
12 beam splitter
34 light beam
14 cylindrical lens
15 photosensitive detector
16 photodiodes
21 light beam
22 optical axis
23 lens
24 carpet of light
25 reference plane
26 light beam
27 plane
28 carpet of light
29 light beam
210 plane
211 carpet of light
212 light beam
213 optical element having positionally dependent transmission
214 light beam
215 light beam
216 light beam
502 coordinate system
504 cylinder
505 axis of rotation
506 illuminating beam
507 cylindrically symmetric optics
508 light source
509 carpet of light
510 printing form
512 beam splitter
511 intermediate optics
514 conversion plane
516 identical optical path of rays
517 imaging optics
518 photosensitive detector
519 imaging optics
520 photosensitive detector
522 imaging light source
524 imaging optics
601 illuminating beam
602 first position of the line of intersection
603 normal direction
604 second position of the line of intersection
605 continuation of the illuminating beam
606 third position of the line of intersection
608 printing form
610 linear plane
612 reflected beam
701 printing form
702 light section
703 reflection transformation
704 path information in the reflected beam
705 linear plane
706 imaging transformation
707 conversion plane
708 image patch
709 optical element having positionally dependent transmission
710 intensity transformation
711 detection plane
712 photosensitive detector
713 photodiodes
714 signal transformation
715 brightness signal
716 signal for individual points
801 first position of the printing form
802 linear plane
803 second position of the printing form
804 rotationally symmetric imaging optics
806 conversion plane
808 rotationally symmetric imaging optics
810 photosensitive detector
812 first point of reflection
814 second point of reflection
816 first detection point
818 second detection point
820 third detection point
901 first position of the printing form
902 linear plane
903 second position of the printing form
904 first cylindrically symmetric imaging optics
906 detection plane
908 second cylindrically symmetric imaging optics
910 conversion plane
912 third cylindrically symmetric imaging optics
914 first point of reflection
916 second point of reflection
918 first detection point
920 second detection point
1001 first position of the printing form 1002 linear plane
1003 second position of the printing form
1004 rotationally symmetric imaging optics
1006 conversion plane
1008 first cylindrically symmetric imaging optics
1010 second cylindrically symmetric imaging optics
1012 detection plane
1014 first point of reflection
1016 second point of reflection
1018 first detection point
1020 second detection point

What is claimed is:

1. A device for determining a positional deviation of n points, n being a natural number equal to or greater than 2, from n disjunct reference positions of the n points, comprising:

a source of electromagnetic radiation;

imaging optics for the electromagnetic radiation; and a photosensitive detector receiving the electromagnetic radiation, the electromagnetic radiation when passing through at least a part of the imaging optics forming a light section impinging upon the location of all n points, positional information from the detector being converted into information on intensity, wherein simultaneous or concurrent in time n signals are produced by the detector, each of the n signals being uniquely assigned to one of the n points;

wherein the deviation in the position of at least one of the n points from the reference position of the at least one of the n points leads, in a defined relationship, to a different light path than a path of the light reflected from the at least one of the n points, through the imaging optics, into the reference position of the at least one of the n points; the positional information of the at least one of the n points thereby being converted into path information;

wherein the imaging optics includes at least one element converting the path information on the light through the imaging optics into information on light intensity.

2. The device as recited in claim 1, wherein the source is a single radiation source generating light.

3. The device as recited in claim 1 wherein the n points lie in one plane or on one straight line.

4. The device as recited in claim 1 wherein the imaging optics includes aspherical optical elements.

5. The device as recited in claim 1 wherein the photosensitive detector includes a plurality of mutually-independent photosensitive elements.

6. The device as recited in claim 5 wherein the photosensitive elements are photodiodes, photocells, photomultipliers, or charged-coupled displays.

7. The device as recited in claim 5 wherein at least two of the n points are precisely and uniquely assigned for at least two of the n mutually-independent photosensitive elements.

8. The device as recited in claim 1 wherein the radiation source emits at least an infrared or visible wavelength.

9. The device as recited in claim 1 wherein the imaging optics has an optical wedge or an edge.

10. The device as recited in claim 1 wherein a section of the imaging optics is arranged downstream from a carpet of light, the section including at least two optical elements having cylindrically symmetric axes orthogonal to one another.

11. The device as recited in claim 1 wherein the imaging optics include an optical element having positionally dependent transmittance, an intermediate image being produced in a conversion plane in which the optical element is located.

12. The device as recited in claim 1 wherein the imaging optics includes at least one beam splitter in a light path downstream from a point of reflection of the electromagnetic radiation.

13. The device as recited in claim 12 further comprising at least one further photosensitive detector having a plurality of independent photosensitive elements, at least one or exactly one of the n points being assigned to each of the mutually independent elements.

14. An imaging device comprising:

n individually drivable lasers and mutually independent imaging optics; and an autofocusing system capable of rendering a shift in focus, independently, for at least two of the n individually drivable lasers, n being a natural number, the autofocusing system being controlled as a function of a measuring result of the device as recited in claim 1.

15. A printing-form imaging unit, wherein the printing-form imaging unit has claim one imaging device as recited in claim 14.

16. A print unit, wherein the print unit has at least one imaging device as recited in claim 14.

17. A printing press, wherein the printing press has at least one print unit as recited in claim 16.

18. A method for determining a positional deviation of n points from n reference positions of the n points, n being a natural number, comprising the steps of:

illuminating each individual one of the n points using electromagnetic radiation;

converting positional information on the points into path information on the radiation;

converting the path information into intensity information; and discriminatingly detecting reflected light from at least two of the n points;

wherein the steps are carried out simultaneously or concurrently in time for all n points.

19. The method as recited in claim 18 further comprising measuring a first intensity of reflected electromagnetic radiation for at least one of the n points before conversion of the path information into the intensity information, wherein a second intensity of t he reflected light measured at a corresponding photosensitive element of the detector after conversion of the path information into the intensity information is compared to the first intensity of the reflected electromagnetic radiation.

20. A device for determining a positional deviation of n points, n being a natural number equal to or greater than 2, from n disjunct reference positions of the n points, comprising:

a source of electromagnetic radiation;

imaging optics for the electromagnetic radiation; and a photosensitive detector receiving the electromagnetic radiation, the electromagnetic radiation when passing through at least a part of the imaging optics forming a light section impinging upon the location of all n points, positional information from the detector being converted into information on intensity, wherein simultaneous or concurrent in time n signals are produced by the detector, each of the n signals being uniquely assigned to one of the n points, wherein a section of the imaging optics is arranged downstream from a carpet of light, the section including at least two optical elements having cylindrically symmetric axes orthogonal to one another.

21. A device for determining a positional deviation of n points, n being a natural number equal to or greater than 2, from n disjunct reference positions of the n points, comprising:

a source of electromagnetic radiation;

imaging optics for the electromagnetic radiation; and a photosensitive detector receiving the electromagnetic radiation, the electromagnetic radiation when passing through at least a part of the imaging optics forming a light section impinging upon the location of all n points, positional information from the detector being converted into information on intensity, wherein simultaneous or concurrent in time n signals are produced by the detector, each of the n signals being uniquely assigned to one of the n points, wherein the imaging optics include an optical element having positionally dependent transmittance, an intermediate image being produced in a conversion plane in which the optical element is located.

* * * * *